United States Patent [19]

Marfilius et al.

[11] Patent Number: 5,407,510
[45] Date of Patent: Apr. 18, 1995

[54] METHOD FOR BONDING A COVER TO A FLEXIBLE PAD

[75] Inventors: Donald F. Marfilius, Farmington Hills; Michael S. Gignilliat, Milford, both of Mich.

[73] Assignee: Douglas & Lomason Company, Farmington Hills, Mich.

[21] Appl. No.: 22,147

[22] Filed: Feb. 22, 1993

[51] Int. Cl.⁶ .................. B29C 33/04; B32B 31/20
[52] U.S. Cl. .................. 156/212; 156/245; 156/285; 156/583.3; 156/492; 297/DIG. 1; 249/81
[58] Field of Search .............. 156/214, 213, 212, 286, 156/285, 245, 583.4, 583.8, 492, 583.3; 297/DIG. 1, DIG. 2; 425/DIG. 20, 389; 249/81

[56] References Cited

U.S. PATENT DOCUMENTS

| | | | |
|---|---|---|---|
| 3,589,967 | 6/1971 | Shirakawa | 156/285 X |
| 4,323,410 | 4/1982 | Urai | 156/228 |
| 4,403,356 | 9/1983 | Urai | 5/481 |
| 4,441,949 | 4/1984 | Kiss | 156/212 |
| 4,559,094 | 12/1985 | Hostetler et al. | 156/212 |
| 4,692,199 | 9/1987 | Kozlowski et al. | 156/245 |
| 5,176,777 | 1/1993 | Guilhem | 156/245 |
| 5,232,543 | 8/1993 | Frelich et al. | 156/583.3 X |

FOREIGN PATENT DOCUMENTS

| | | | |
|---|---|---|---|
| 2219964 | 12/1989 | United Kingdom | 297/DIG. 1 |
| WO9000519 | 1/1990 | WIPO | |

*Primary Examiner*—Michael W. Ball
*Assistant Examiner*—Michele K. Yoder
*Attorney, Agent, or Firm*—Harness, Dickey & Pierce

[57] ABSTRACT

An assist fixture is provided to clamp about a seat assembly, whereupon each are immersed into pressed relation against a heated fluidized bed. The seat assembly includes a preformed flexible pad having an appearance surface and a cover adapted to be adhesively bonded to the pad during the immersion. The assist fixture includes tubular members which press the cover into preformed indentations in the appearance face of the pad to assist in enhancing surface definition, the tubular members being adapted to pass hot or cold air depending on the stage of the process.

37 Claims, 7 Drawing Sheets

METHOD FOR BONDING A COVER TO A FLEXIBLE PAD

BACKGROUND OF THE INVENTION

1. Technical Field

This invention relates to a method and apparatus for covering an object with a sheet of flexible material and, more particularly, to an assist fixture in combination with a fluidized bed for bonding a cover material to a contoured substrate such as a urethane pad to form an attractive assembly retaining soft-surface touch as well as providing sharp definition of features.

2. Background Art

Numerous commercial products are formed by adhering a fabric cover or other such material to rigid and semi-rigid foam panels. Adhering the sheet material to a nonplanar substrate is quite difficult especially when it is required that the adhered fabric have the same profile or contour as the nonplanar substrate. One good example of such a product is the seat or the interior door panel incorporated into a vehicle such as an automobile.

Typically, these vehicle panels are required to include decorative features and simulate the pleats that would be associated with a traditional cut-and-sew assembly. It is generally desired that all the contour features be comfortable to the touch and appealing to the eye, for which reasons each contour feature is generally covered by a layer of fabric or other suitable sheet material, such as vinyl or leather, that may include bilaminate or trilaminate constructions. Methods of constructing such an assembly in an economical manner, which reduce costs or eliminate labor-intensive steps, are always being sought.

An exemplary fabrication is disclosed in U.S. Pat. No. 4,692,199 to Kozlowski wherein high temperature steam is forced through a porous mold to heat and diffuse an adhesive film into adherence with an adjacent fabric layer and foam pad to secure the two together. However, high temperature steam can be detrimental to the foam and require additional overbuild of the foam to compensate for height loss. Accordingly, this translates into a more costly product.

By using hot air instead of high temperature steam, such as with a fluidized bed, there is no detrimental result to the foam. In the process for covering an object such as a seat disclosed in application Serial Number WO 90/00519, published Jan. 25, 1990, a fluidized bed of particles is covered with a porous pliable membrane, a flexible cover is placed above the membrane, pressure is applied to the object, the flexible cover is deformed as the object is immersed in the fluidized bed until a mating imprint is formed on the object. The covering can be effected by gluing, in particular with a previously applied heat-activated adhesive, in which case the fluidized bed is obtained by means of a current of hot air at a temperature above the activation temperature of the adhesive.

The fluidized bed approach is attractive, particularly when compared to other bonding processes, because no costly custom-designed molds are required for the bonding setup. Further, as the complexity of the contour increases, so will the registration of the cover to the foam, the amount of sharp definition attainable without bridging of the cover sheet, and the possibility of wrinkles in the cover sheet.

Accordingly, it is an object of this invention to provide a novel method and apparatus for constructing a vehicle seat or trim panel of foam and having a soft surface touch.

A further object of this invention is the elimination of labor-intensive steps in bonding fabric to a foam pad.

Another object of this invention is provision of an economical method of bonding a seat cover to a foam pad wherein the seat cover can be attached to a frame before the bonding process so that the seat is complete when removed from the press.

Another object of this invention is the provision of a novel assist fixture to provide definition on the appearance surface of the cover sheet subsequent to the bonding process.

A further object of this invention is provision of an assist fixture in which hot and/or cold air can be circulated to shorten the cycle time of the bonding process.

Disclosure of Invention

According to the present invention, a normally non-tacky, in-use dry adhesive is applied to the back of a cover sheet, the cover sheet is positioned on a resilient foam pad, an assist fixture is lowered against the cover and the cover pressed against the appearance surface of the foam pad to form an assembly. The assembly is immersed in a fluidized bed of heated refractory beads and pressed thereagainst for a period sufficient to activate the adhesive and bond the cover sheet to the pad. The assembly is thereafter cooled by exposure to ambient air. The bonding process can include precoating the cover sheet with the adhesive or interposing a separate sheet of dry adhesive between the back of the cover sheet and the appearance surface of the foam pad. The positioning step can include applying a vacuum through the foam pad, just prior to immersing the assembly into the bed, to facilitate the drawing of heated air through the pad. In addition, it is preferred to continue the application of a vacuum through the cover sheet and foam pad both during the immersion of the assembly in the heated fluidized bed and during the removal step to facilitate rapid activation and subsequent curing of the adhesive.

According to an important feature of this invention, the appearance surface of the foam pad is preformed to include indentations representative of seat features, and associated tubes of the assist fixture are in the form of the seat features to be simulated to enhance the surface definition and adherence of the cover sheet. Further, the tubes of the assist fixture are adapted, if necessary, to pass hot air or cold air, depending on such factors as the stage of the process, the specific adhesive, the ability of the sheet material to withstand a specific temperature, and the nature of the indentations or other style features on the appearance surface of the foam pad.

Advantageously, the apparatus and process in combination with the fluidized bed eliminates the requirement for special matched metal or plastic bonding tools or molds.

Further, the assist fixture in combination with the fluidized bed and foam pad enables the part to be finished in situ and in one step. The fabric cover is attached to the pad before the bonding process so that the finished product, such as a finished seat assembly, is complete when removed from the fixture. By such process, costly molds are eliminated. Importantly, the fabric is subjected to only one heating, thereby minimizing the likelihood that a polymeric fiber will degrade under repeated exposure to the heat level needed for a given process.

Additional advantages include the provision of a foam seat having a bonded cover which is breathable; a process that is reversible in that both the cover and the foam pad can be reclaimed; and a process that permits the cover to be preformed to thereby assure proper cover registration for complex shapes or highly defined parts.

Further objects, advantages, and features of the present invention will become more fully apparent from the detailed consideration of the arrangement and construction of the constituent parts as set forth in the following description taken together with the accompanying drawings.

DETAILED DESCRIPTION OF THE PREFERRED EMBODIMENT

Turning now to the drawings, FIGS. 1-12 illustrate a method and heated circulating fluidized bed 10 apparatus for bonding a cover material to a resilient foam pad. In brief, the invention contemplates preforming the resilient foam pad, possibly so as to include indentations on its appearance face that are representative of surface features, and applying heat and pressure to activate a dry heat-activatable adhesive to bond the cover sheet to the foam pad. Although the foam pad described herein is intended for use in an automotive vehicle, such as in a vehicle seat assembly, it is to be understood that such description is exemplary and could be employed in other applications requiring bonding of sheet material to a resilient support base and simulation of the appearance features of a cover installed using the traditional cut-and-sew approach.

Figure 4:
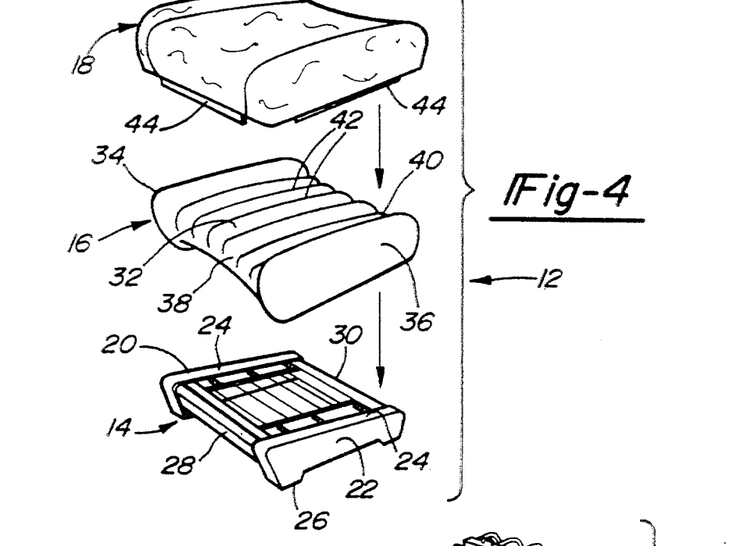
FIG. 4 is an exploded perspective view showing a preformed cover, a foam pad, and a seat frame positioned for assembly into a preassembly.
Figure 5:
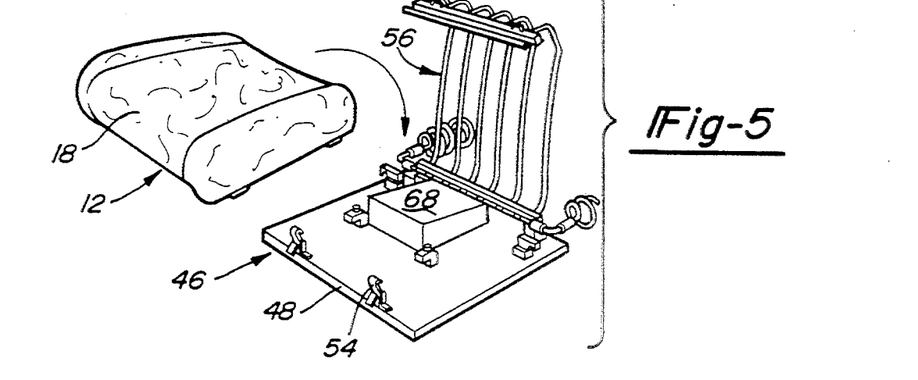
FIGS. 5-7 are perspective views showing the preassembly being fixedly mounted to the assist fixture.
Figure 6:
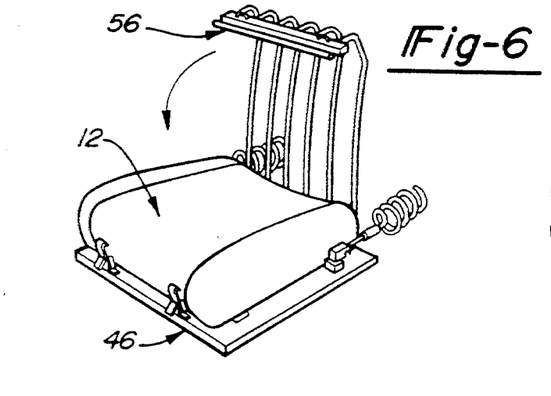
Figure 7:
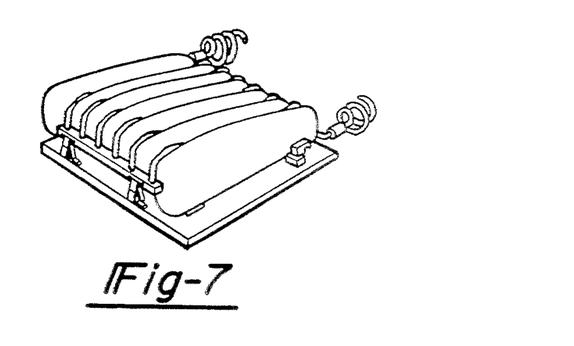

As shown best by reference to FIG. 4, a seat assembly 12 includes a conventional seat pan 14, a resilient foam pad 16, and a seat cover 18 of a fabric material to be bonded to the foam pad. The seat pan includes a pair of side frames 20 and 22 each including an upper and lower frame portion 24 and 26, and forward and rearward frame portions 28 and 30 extending between the side frames.

The foam pad 16 is preformed of a resilient material and includes a contoured top appearance surface 32, a pair of sidewalls 34 and 36, and front and back portions 38 and 40. The foam pad is configured to seat about the seat pan 14 so that the side walls confront the side frames and the front and back portions confront the forward and rearward frame portions. Alternatively, the seat pad 16 may be formed integrally with the pan 14 by placing the pan directly into the pad mold during the molding process. The resilient pad material is known to those skilled in the art and generally comprises a material that is capable of being exposed to elevated temperatures without undergoing material degradation or losing resiliency. Suitable materials include urethane foam polyester fiber, fiber board, and thermoplastic. These materials are exemplary and for the purpose of illustration, and is not intended either to be limiting or to exclude other compositions.

According to an important feature of this invention, the contoured appearance surface 32 of the foam pad 16 frequently includes various stylized recesses and indentations, such as would be seen in a finished product wherein the seat cover has been stitched to a cushion. As shown, the appearance surface includes a plurality of elongated linear indentations or grooves 42, the grooves being laterally spaced in generally parallel relation to one another and extending between the front and back portions 38 and 40 of the pad. The indentations could also be criss-crossed to simulate a tufted surface as is found in upholstered seats.

The seat cover 18 is generally formed into the exterior shape of the foam pad 16 and includes an outer appearance surface, an inner surface adapted to face the pad, and marginal edges. For attachment to the seat pan and the foam pad, a plurality of J-hooks 44, hog rings, or other such fastening means, are provided along the marginal edges of the seat cover with the hooks being adapted to be connected to the underside of the seat pan.

The process of bonding a fabric cover to a foam member is a function of the particular fabric and its ability to withstand elevated temperature without degradation, the particular adhesive used, and the process steps. Good bond strength can be achieved with both dry and wet adhesives.

The process of the present invention contemplates the use of many different materials, such as polymeric fiber cloths, crushed velvet, and velour. As will be described, leather and vinyl are also within the contemplation of the invention.

The back of the seat cover 18 is preferably selectively precoated to include a normally non-tacky, in-use layer of dry heat-activatable adhesive. In the preferred embodiment, only the central portion of the back of the seat cover 18 is precoated so that only the central portion of the seat cover will be bonded to the pad. The J-hooks 44 will then allow the sides of the seat cover extending around the periphery of the foam pad to flex independently of the pad, thereby to inhibit the onset of creases. Typically, the adhesive is applied to the seat cover by initially misting the back of the seat cover with moisture so that it is slightly damp and then powder coating the dry adhesive onto the selected central portion of the seat cover. In this manner, the dry adhesive remains in place on the back of the seat cover 18 during handling. Optionally, the adhesive may be held in place by preliminarily heat setting the adhesive powder to the back of the fabric cover. Alternatively, a separate sheet of such dry heat-activatable adhesive may be interposed between the cover and the central portion of the pad. Furthermore, the adhesive may alternatively or additionally be applied to the central portion of the show surface 32 of the foam pad 16.

While many adhesives are available, powdered polyamide adhesives have been found desirable. When such powder adhesives are used, if the bonding is done improperly, the bonding process is reversible through the re-application of heat so that the seat cover can be removed from the pad, and the cover and pad each reused.

Vinyl and leather are very sensitive to high temperatures, and are believed to require a spray adhesive. Unfortunately, such adhesives, when cured, do not permit the seat cover 18 to be removed from the pad (i.e., the bonding is not reversible).

According to this invention, there is provided a mounting fixture 46 to hold the seat cover 18 in aligned relation to the contour of the pad 14 and to provide the desired surface definition in the seat cover 18. In particular, the mounting fixture 46 includes an assist tool 56 that ensures an intimate contact between the seat cover and the pad within the indentations in the show surface of the pad to ensure that the seat cover is properly bonded to the pad in these areas. In the preferred embodiment the assist tool 56 is additionally employed to facilitate the activation as well as the subsequent curing of the adhesive. The assist tool 56 also serves to properly register the cover to the pad and inhibit the seat cover 18 from shifting relative to the contour of the foam pad 16 during the bonding process.

Figure 3:
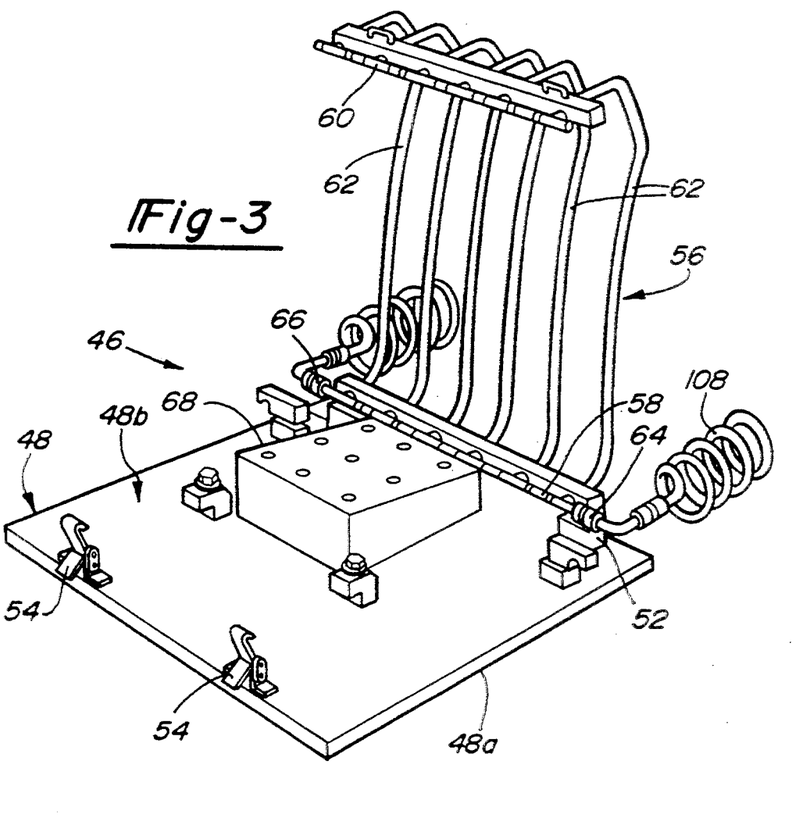
FIG. 3 is a perspective view of an assist fixture according to this invention.

With particular reference to FIG. 3, the mounting fixture 46 comprises a flat support base 48 having upper and lower surfaces 48a and 48b, mounting lugs 50 (FIG. 8) projecting upwardly from the upper surface 48a, and an apertured air manifold 68 extending from the lower surface 48b of the fixture 46. The assist tool 56 is pivotably mounted to the fixture 46 via a pair of hinge members 52, and comprises a tubular frame having a pair of longitudinal ends 58 and 60, the end 58 being pivotally mounted to the hinge members 52 and the end 60 being free to pivot into and from secured engagement with a pair of latch members 54 located on fixture 46.

The assist tool 56 in the preferred embodiment is comprised of a plurality of small diameter air tubes 62 integrally joined and interconnected to pass air between an inlet and outlet end 64 and 66 thereof, these ends being connectable to a source of pressurized air. The assist tool 56 is adapted to be pivoted onto the top of the seat cover 18 so that the air tubes 62 register with and seat within the corresponding indentations 42 in the pad. As will be described, heated air can be passed through the assist tool 56 via the inlet end 64 during one stage of the bonding operation, and cooling air can be passed through the assist tool 56 via the outlet end 66, if desired, during another stage of the bonding operation.

The apertured air manifold 68 comprises a rectangular land that projects upwardly from the lower surface 48b of the mounting fixture 46 for positioning within an internal cavity formed by the walls of the seat pan. Alternatively, in applications where the pad has been molded directly to the pan, the pad may be provided with an internal cavity on its underside for receiving the air manifold. The manifold 68 is connected to a source of vacuum and serves several important functions. Firstly, the manifold serves to draw heat through the seat cover and foam pad during the heating process when the assembly is immersed in the fluidized bed to facilitate complete and rapid activation of the adhesive. Secondly, the manifold 68 draws ambient air through the seat cover and foam pad to cool the assembly and facilitate rapid curing of the adhesive after the assembly is removed from the fluidized bed.

With particular reference to FIGS. 1, 2, 11, and 12, an apparatus for carrying out the invention includes the circulating fluidized bed 10, one or more mounting fixtures 46, a shuttle rail system 70 for transporting the mounting fixtures above the fluidized bed, and a ram 72 for receiving and driving a loaded mounting fixture into the fluidized bed. The mounting fixture 46 is preloaded with the elements of a seat assembly 12, is moved into engagement with the ram, and driven vertically downwardly by the ram and into pressed relation against the fluidized bed.

Figure 1:
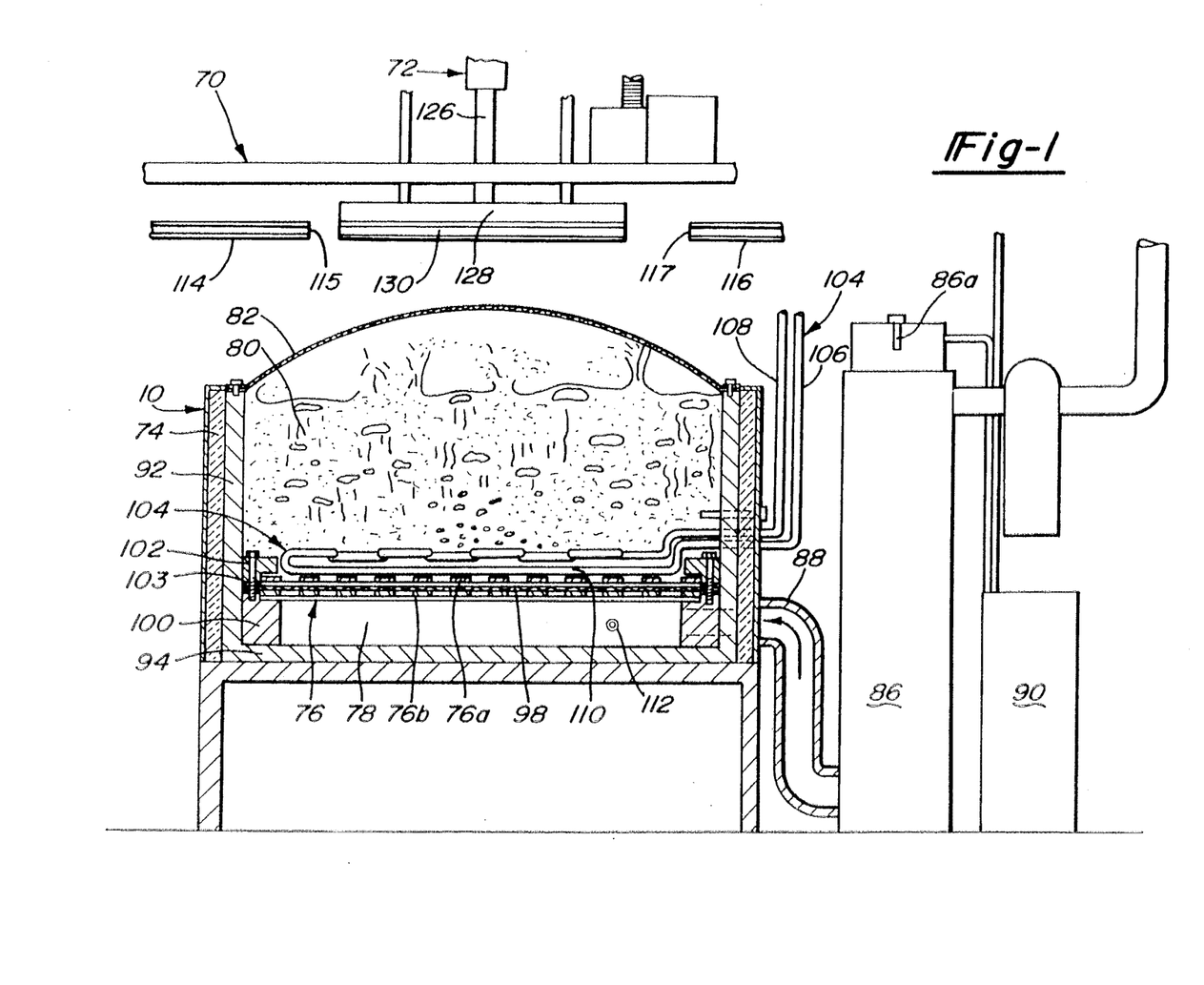
FIG. 1 is an end view in elevation, partially in cross-section, of process apparatus including a fluidized bed for practicing this invention.
Figure 2:
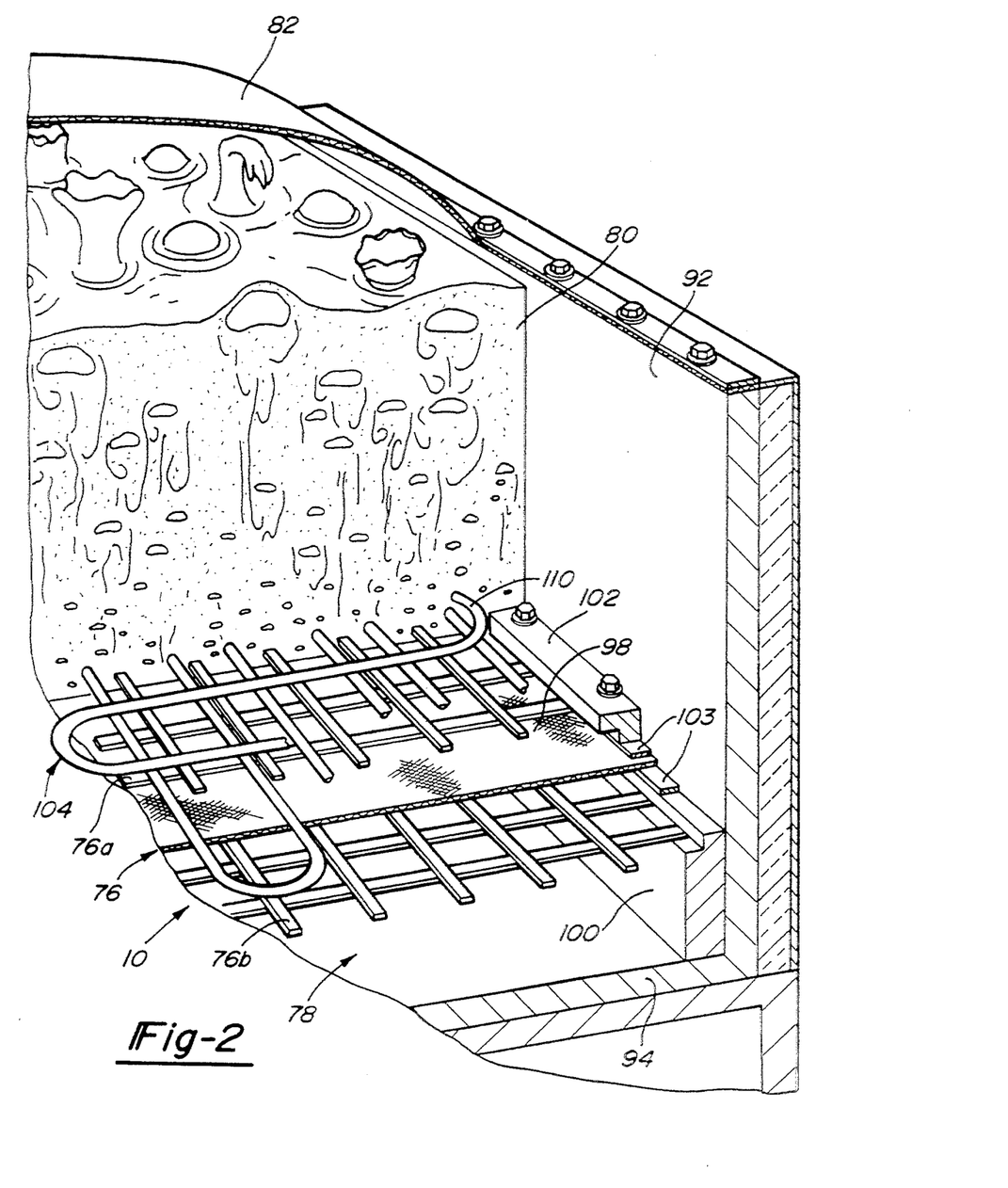
FIG. 2 is a perspective view looking downwardly at a fragmentary cut-away of the fluidized bed apparatus shown in FIG. 1.

The fluidized bed 10 includes an oblong container in the form of a generally rectangular box 74 having a grate system 76, a chamber or plenum 78 formed below the grate system at the bottom of the box, a mass of particulate matter in the form of refractory glass beads 80 supported on the grate system, and a thin filter cloth or membrane 82 secured along its peripheral edges to the upward extension of the box so as to be in covering relation vertically above the glass beads. Further, the box is connected to an ambient air source 84 capable of supplying a relatively high volume of ambient air at relatively low pressure to fluidize the bed, a heater 86 for heating the air, an air manifold 88 for introducing the heated low pressure air into the chamber 78, and a control system 90 for controlling the sequence of operation.

The box 74 comprises a plurality of vertically directed, thermally insulated walls 92 and a base 94, the walls having their lower ends adjoined to the base and their upper ends forming a rectangular opening for securing the membrane cloth. The beads 80 must be small enough to provide flotation and conformity, yet not be so small as to blow through the membrane cloth 82, and must withstand the temperatures necessary to activate a heat-activatable adhesive. The cloth 82 is permeable, compliant to conform to the shape of the pad when the pad is pressed against the bed, and sufficiently heat resistant to withstand the temperature of the glass beads.

The grate system 76 includes upper and lower lattices 76a and 76b and a woven stainless steel wire mesh screen 98 sandwiched between the lattices. The mesh screen 98 must be sufficiently and homogeneously porous to pass air vertically from the chamber to uniformly fluidize the bed, and yet be impervious to the passage of the beads.

A plurality of stepped support blocks 100 and associated retainer blocks 102 are located on the base and against the inner surface of the walls to vertically support the grate system 76 horizontally above the base. The retainer blocks 102 are generally L-shaped in cross-section to form an annular inwardly opening recess above the support block 100 sized to receive the peripheral edges of the grate system. The retainer blocks 102 are threadably engaged to the respective support blocks 100 and each operates to compress a pair of gaskets 103 against the peripheral edges of the mesh screen 98 and against the support block 100 to form an air-tight seal around the edges of the bed and inhibit draughts which might otherwise effect the distribution of the fluidizing air through the bed.

In a preferred application, the glass beads 80 are spherical having a nominal diameter of approximately 425–650 microns (0.0165–0.0242 inch), the mesh screen 98 has a mesh size of about 10 microns, and the membrane cloth 82 is comprised of monofilament polyester or nylon having a mesh size of about 25–35 microns, each being known and commercially available.

A tube 104 having opposite inlet and outlet ends 106 and 108 has a serpentine central portion 110 disposed above the grate system 76 and in the bed of heated glass beads, the tube defining a continuous air path between an external source (not shown) of compressed ambient air at low volume and high pressure and the assist tool 56. The tube 104 has its inlet end 106 connected to the external source and its outlet end 108 connected to the inlet end 64 of the assist tool 56. The high pressure air passed through the tube is heated by the exposure of the tube to the heated beads to provide heated air to the associated air tubes 62 of the assist tool 56, such as during the period that the assist tool is immersed in the fluidized bed to activate the adhesive.

According to an alternative feature of this invention, the supply of heated air to the assist tool 56 may be continued after the loaded fixture assembly has been withdrawn from the fluidized bed if required in a particular application to enhance the bonding of the fabric to stylized features on the seat cover. For example, while most of the fabric is being cooled by ambient air being drawn by the vacuum source through the seat cover and pad into the air manifold 68, the heated tubing of the assist tool can provide extended localized heating of the adhesive in the region of the preformed grooves on the show surface 32 of the foam pad to ensure proper activation of the adhesive in these regions. Additionally, the temperature of the air presented to the assist tool can be lower than the temperature of the bed.

According to another feature of this invention, the outlet end 66 of the assist tool 56 is connectable to a cool air source (not shown). A suitable period after the fixture assembly is removed from the fluidized bed, a valve (not shown) can be used to switch the air circulating through the assist tool from the heated air via the inlet to cooling air via the outlet to facilitate cooling of the seat assembly.

The heater 86 is adapted to heat the air from the source 84 to a desired temperature, sufficient to heat the beads and activate the adhesive. To assure that the process temperature has been achieved, a thermocouple 86a controls the temperature of the air supplied and a thermocouple 112 is disposed in the chamber 78 to sense the temperature of the air supplied to heat the bed.

In operation, the air is supplied to the chamber at about 600° F., the bed fluidized and heated, with the air coming through the bladder approximately between 240–300° F. with 280° F. being preferable for most applications.

Figure 8:
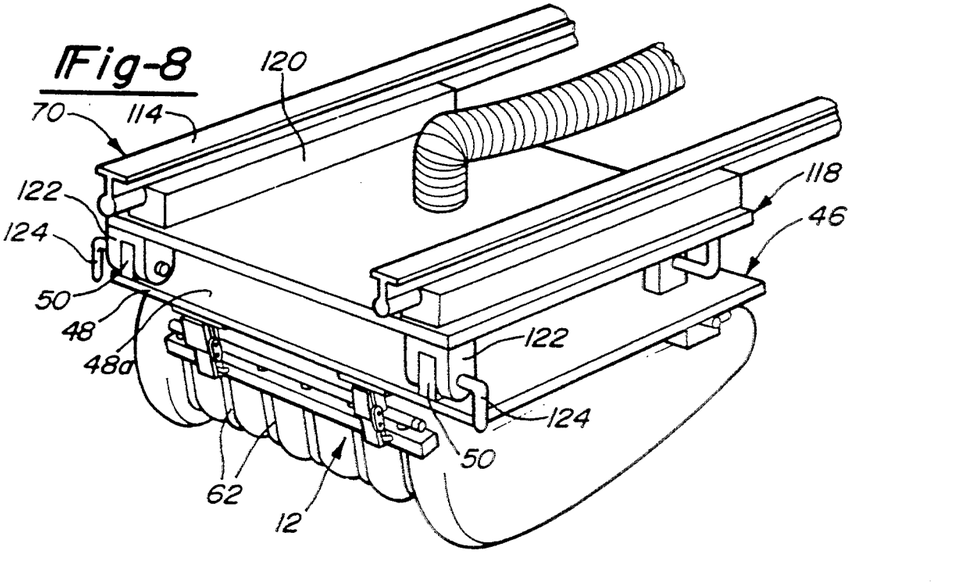
FIG. 8 shows a portion of a shuttle rail system which extends across the fluidized bed and the assist fixture with the preassembly mounted for movement relative to the shuttle rail.
Figure 9:
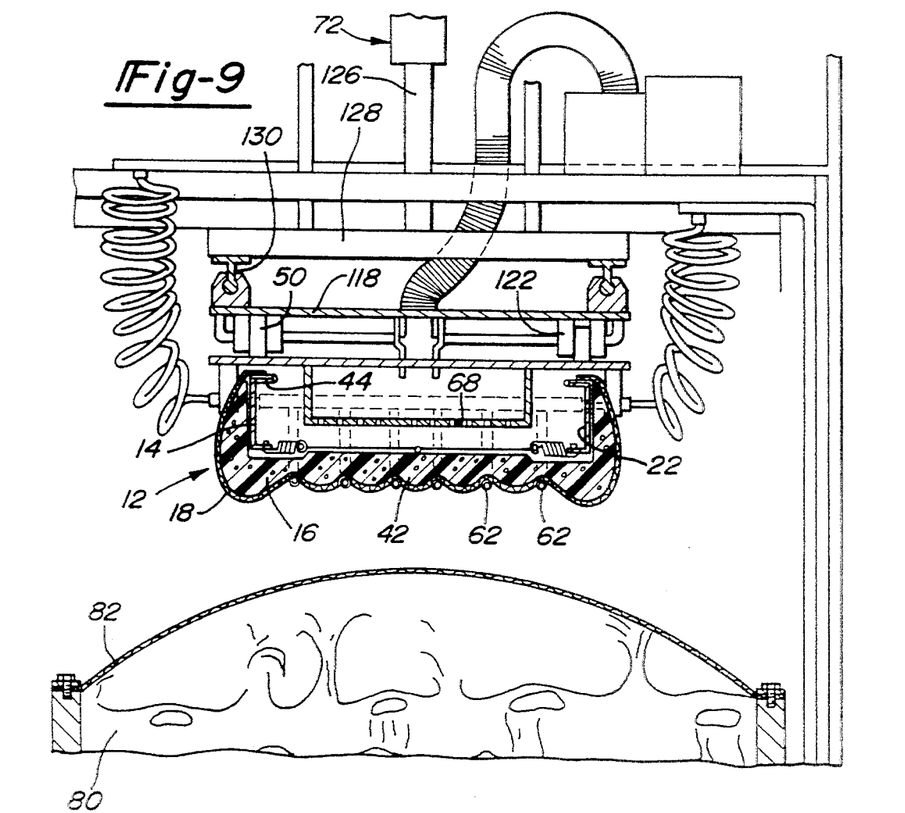
FIGS. 9-10 are fragmentary end views of the apparatus, in elevation, showing the assist fixture with the preassembly, respectively, positioned above and pressed against the fluidized bed.

The shuttle rail system 70 includes a pair of first rail assemblies 114 and 116 having their terminal ends 115 and 117 laterally spaced from one another, and a shuttle 118 including a second rail assembly 120 which is engageable with and movable along the rails 114 or 116. The shuttle 118 includes mounting lugs 122 which are engageable with the lugs 50 on a mounting fixture 46, the lugs being removably mounted together by pins 124.

Figure 11:
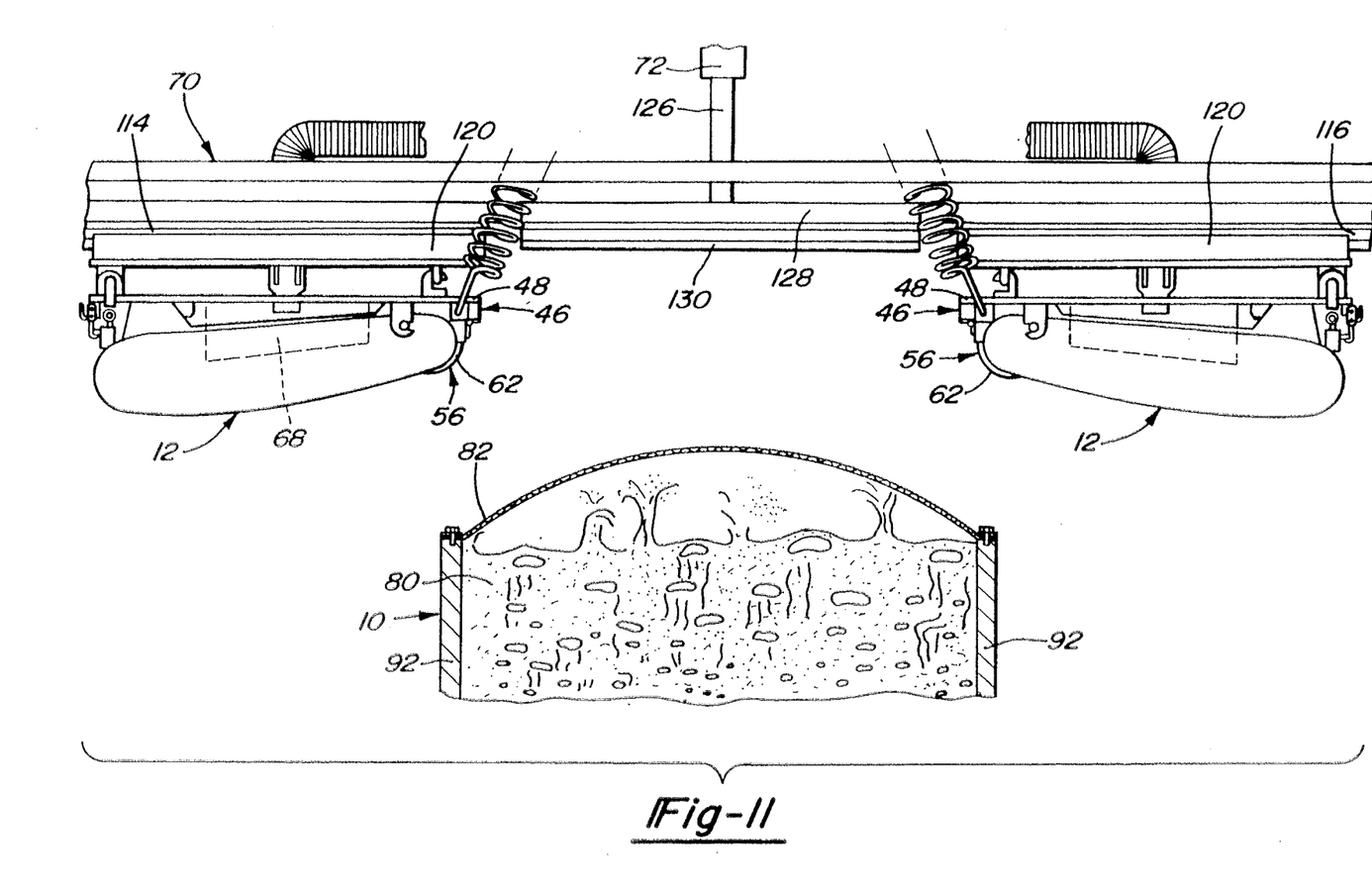
FIGS. 11-12 are fragmentary side views of the apparatus, in elevation, showing the assist fixture with the preassembly, respectively, positioned above and pressed against the fluidized bed.
Figure 12:
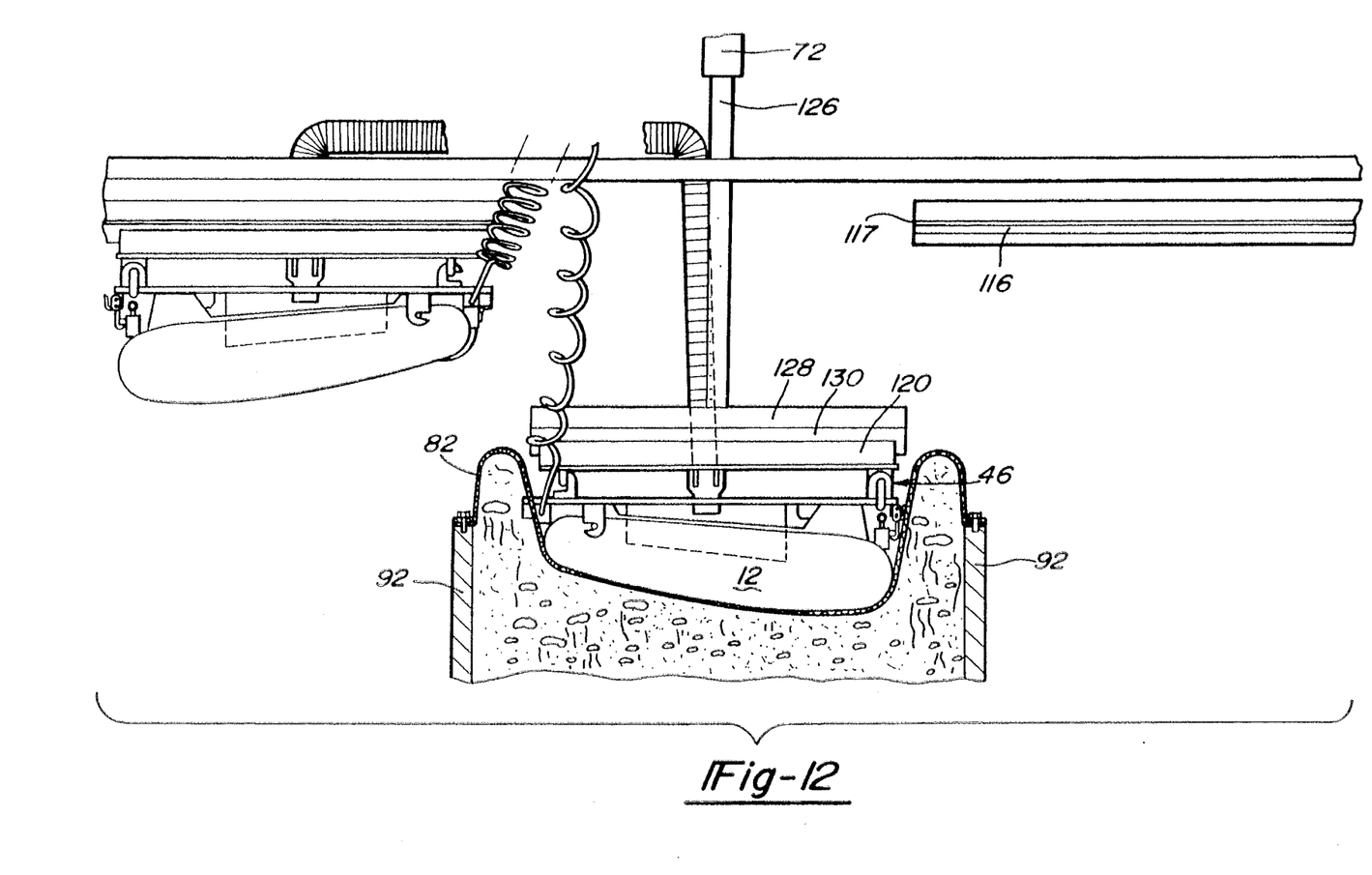

The ram 72 includes a vertically reciprocable piston 126, and a press 128 at the end of the piston. The press 128 includes a rail assembly 130 that is adapted to interengage with the second rail assembly 120 on the shuttle 118 to receive the loaded fixture, the press being adapted to drive the loaded fixture assembly into the fluidized bed.

The rail assemblies 114,116, and 130 cooperate to form a continuous rail system to engage the rail assembly 120 on the mounting fixture 46 to move successive mounting fixtures into registration with the ram. In the embodiment shown, each rail assembly includes a pair of rails in side-by-side relation.

The control system 90 is provided to regulate the temperature of the fluidized bed and the flow of fluid through the assist fixture in accordance with operation sequences.

Figure 10:
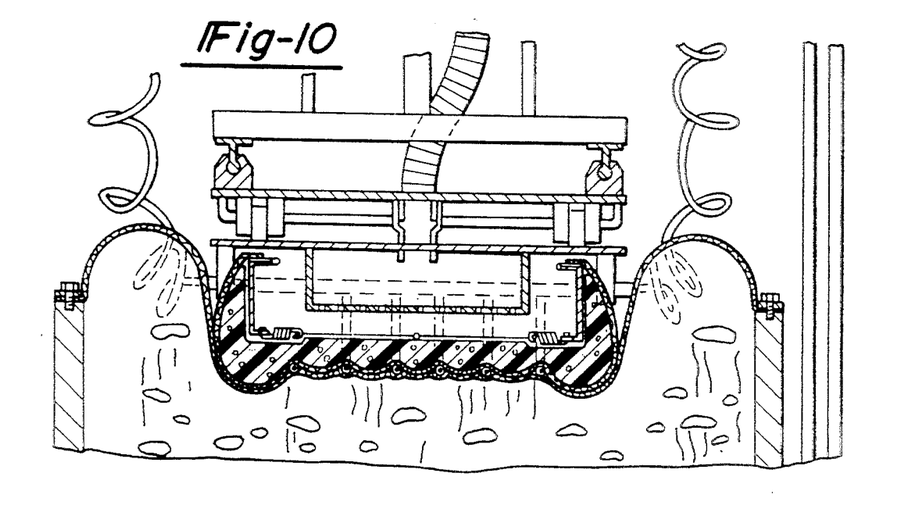

In operation, the bonding system according to the present invention functions in the following manner:

1. The fluidized bed 10 is activated by injecting heated air into the bed and the temperature of the bed is brought up to its appropriate operating temperature.
2. The foam pad 16 and pan 14 subassembly is positioned on the mounting fixture 46 and the seat cover 18 with the adhesive applied to its backside is placed over the pad 16 and connected to the pan 14 with the J-hooks 44.
3. The assist tool 56 is then pivoted into registration with the indentations in the show surface of the pad to provide the desired surface definition in the seat cover, and latched to the mounting fixture 46 via latches 54.
4. The mounting fixture with the seat subassembly 12 is then loaded onto the first rail assembly 114 where it is thereafter shuttled onto rail assembly 130 to orient the mounting fixture with the ram press 72.
5. The ram is then activated to lower the loaded mounting fixture assembly into the fluidized bed 10. The seat subassembly 12 is thus pressed down into the fluidized bed against the cloth 82 so that the fluidized beads yield to the contour of the seat, as shown in FIG. 10. Optionally, at this stage of the process the flow of fluidizing air may be lowered to stabilize the bed in conformance with the contour of the seat.
6. The ram is held in the down position pressing the seat-covered pad against the contour-conforming fluidized bed for a time period sufficient to activate the adhesive and bond the seat cover to the pad. In the preferred embodiment, this step is performed in approximately 30 to 60 seconds. Note that during this stage the vacuum source is drawing heated air from the fluidized bed, through the seat cover and pad, into the air manifold 68 on the mounting fixture, thereby enhancing the activation of the adhesive. Additionally, during this stage of the process it may further be desirable to activate the control system 90 to circulate heated air through the assist tool 56 to ensure proper activation of the adhesive within the indentations in the show surface of the pad.
7. Thereafter, the ram is raised, extracting the loaded mounting fixture assembly from the fluidized bed, and the assembly is shuttled out of registration with the ram 72 and back onto the first rail assembly 114. The vacuum source now begins to draw cooling ambient air through the seat subassembly into the air chamber 68, thereby facilitating the rapid cooling of the seat subassembly and the consequent curing of the adhesive. As previously noted, depending upon the application and the particular configuration of the product, it may be desirable to maintain the flow of heated air through the assist tool 56 for a predetermined extended period of time after the assembly has been withdrawn from the fluidized bed to ensure proper activation of the adhesive within the various indentations in the pad. Subsequently, the control system 90 will terminate the flow of heated air through the assist tool 56 and initiate the flow of cooling air through the assist tool to effectively cool and cure the adhesive within the indentations.

Significantly, it will be appreciated that when the assist tool 56 is used in this manner as a conduit for heated and cooling air, the overall cycle time of the bonding process can be minimized as it no longer becomes necessary to, firstly, extend the immersion period to ensure that the heat from the fluidized bed has adequately permeated all of the various indentations in the pad, and secondly, extend the cooling period while the seat subassembly remains on the mounting fixture to ensure complete curing of the adhesive. Consequently, with the overall cycle time of the bonding process reduced, the production capacity of the equipment is increased and the cost of production reduced.

8. Lastly, the loaded mounting fixture assembly is removed from the rail assembly 114, the assist tool 56 is unlatched, and the completed seat subassembly is removed from the mounting fixture 46.

Preferably simultaneously with the first mounting fixture assembly being operated on, a second operator loads, or unloads, a second seat subassembly onto a second mounting fixture on the second rail assembly 116. When the first loaded mounting fixture assembly has been retracted from the fluidized bed and moved back to the first rail assembly, the second loaded mounting fixture subassembly is moved to the ram and immersed into the fluidized bed, during which time the first operator unloads the first completed seat subassembly and loads another first seat subassembly onto the first mounting fixture.

While the above description constitutes the preferred embodiment of the invention, it will be appreciated that the invention is susceptible to modification, variation, and change without departing from the proper scope or fair meaning of the accompanying claims.

What is claimed is:

1. A process for securely bonding a cover having front and back surfaces to a flexible pad having a contoured appearance surface with at least one appearance depression and a peripheral side, said process comprising the steps of:

positioning the back of said cover on said appearance surface to form an assembly, said back or said appearance surface being coated with a heat-activatable adhesive, mounting the assembly to a support frame, clamping said cover to the appearance surface of said pad with an assist fixture having a tubular member that forces a portion of said cover into said at least one appearance depression, with the assist fixture clamped thereon, substantially simultaneously applying both pressure and heat to substantially the entire area of the front of said cover to force said cover into engagement with substantially the entire area of the appearance surface of said pad and activate the adhesive, including initiating the flow of relatively heated fluid through said tubular member to enhance activation of said adhesive in said appearance depression, and terminating the application of heat to the assembly including terminating the flow of heated fluid through said tubular member to cure the adhesive and complete the bonding process of the cover to the appearance surface of the pad including to said appearance depression.

2. The process as claimed in claim 1, wherein the positioning step further includes securing the marginal edge portion of said cover around the peripheral side of said pad, and disposing the adhesive on the back of said cover such that during the heat-applying step the central area of said cover is bonded to the pad and the marginal edge portion of the cover is not bonded to the peripheral side of the pad but is free to allow minor flexing of the cover to inhibit the onset of creasing.

3. The process as claimed in claim 1, wherein the pressure and heat applying step includes forcing the appearance surface side of the assembly into conforming engagement with a fluidized bed of heated particles maintained fluid by an air source at a temperature sufficient to activate the adhesive.

4. The process as claimed in claim 3, wherein the clamping step includes positioning the assist fixture into releasable engagement with the assembly to force the cover into intimate engagement with the at least one appearance depression in the pad.

5. The process as claimed in claim 1, wherein the appearance surface of said pad is preformed to include a contoured surface having a plurality of appearance depressions and said assist fixture includes a corresponding plurality of tubular members adapted to be received within said appearance depressions.

6. The process as claimed in claim 5, wherein the pressure and heat applying step includes substantially simultaneously forcing relatively heated fluid through each of said tubular members.

7. The process as claimed in claim 3, wherein said flexible pad is comprised of a porous material, and further including the step of applying a vacuum to the side of said porous material opposite to said appearance surface to draw heated air from said fluidized bed through said pad to enhance activation of the adhesive.

8. The process as claimed in claim 7, including removing the assembly from the fluidized bed after the adhesive has been activated, and thereafter maintaining the vacuum for a time sufficient to enhance cooling of the cover.

9. The process as claimed in claim 1, further including the step of forcing relatively cool fluid through said tubular member after terminating the application of heat to said assembly.

10. In a process for covering the appearance surface of a flexible pad having at least one appearance depression with at least one flexible cover sheet, the steps of the method comprising:

preassembling the pad onto a support fixture and securing the cover sheet onto the pad to form an assembly, positioning an assist fixture having a member relative to the assembly so that said member is aligned with said appearance depression in said pad and forcing said member against said flexible cover to force a portion of said flexible cover into said appearance depression, pressing the assembly with said assist fixture positioned thereon into a heated fluidized bed whereby the bed conforms to the contour of the appearance surface of the pad and presses the cover sheet against substantially the entire area of the appearance surface of the pad, maintaining the pressed engagement until a layer of heat-activatable adhesive between the cover sheet and the pad activates and bonds the cover sheet to the pad, removing the assembly from the bed and allowing the adhesive to cure while retained by the assist fixture, removing the assist fixture from the assembly, and removing the assembly from the support fixture.

11. The process as claimed in claim 10, including the step of precoating the back of said cover sheet with said heat-activatable adhesive.

12. The process as claimed in claim 10, including the step of inserting a separate sheet of heat-activatable adhesive between the cover sheet and the appearance surface of the pad, prior to the step of pressing the support fixture into the fluidized bed.

13. The process as claimed in claim 10, wherein the member of said assist fixture comprises a tubular frame, and further including the step of passing fluid through said tubular frame during said heating and curing steps.

14. The process as claimed in claim 13, wherein heated air is passed through said tubular frame during said heat-applying step and ambient cooling air is passed through said tubular frame during said curing step.

15. The process as claimed in claim 13, including the step of positioning a tubular conduit in said heated fluidized bed, said tubular conduit having a first end connectable to a source of air and a second end connectable to said tubular frame, whereby air passed through the tubular frame is heated by the heated fluidized bed.

16. The process as claimed in claim 15, including the step of controlling the temperature of the air passed through said tubular conduit while said assembly is pressed into the fluidized bed.

17. The process as claimed in claim 10, wherein said preassembling step further includes connecting a vacuum source to the support fixture so that heated air is drawn through the assembly when the assembly is pressed into the fluidized bed to enhance activation of the adhesive.

18. The process as claimed in claim 17, including the step of continuing to draw air through said assembly after removal of said assembly from said fluidized bed and prior to removal of said assist fixture to facilitate cooling of the bonded cover sheet prior to removal of said assembly from said support fixture.

19. The process as claimed in claim 17, wherein the preassembling step includes securing the marginal edge portion of the cover sheet adjacent to the rear side of said pad.

20. The process as claimed in claim 10, further including the steps of providing above the fluidized bed a ram and first and second rails each having a terminal end adjacent to the ram and opposite terminal ends spaced from one another, mounting a first and a second support fixture, respectively, on said first and second rails, loading a first assembly onto said first support fixture while pressing a second assembly previously loaded onto said second support fixture and transferred from said second rail to said ram, into said fluidized bed, removing said second assembly from said fluidized bed and transferring said second support fixture from said ram to said second rail, transferring said first support fixture from said first rail to said ram and pressing said first assembly into said fluidized bed while said second assembly is unloaded from said second support fixture and a third assembly is loaded onto said second support fixture, removing said first assembly from said fluidized bed and transferring said first support fixture from said ram to said first rail, and transferring said second support fixture from said second rail to said ram and pressing said third assembly into said fluidized bed while said first assembly is unloaded from said first support fixture and a fourth assembly is loaded onto said first support fixture.

21. The process as claimed in claim 10, including preforming the foam pad to include a plurality of laterally spaced appearance depressions in said appearance surface, and wherein said assist fixture has a corresponding plurality of members configured to align with said appearance depressions, and further wherein said positioning step includes forcing respective members of the assist fixture against said cover sheet and into said respective depressions.

22. A process for securely bonding a cover to a flexible pad, said pad having a contoured front appearance surface, a back side and peripheral sides, said process comprising the steps of:

positioning the back of said cover on said appearance surface and over said peripheral sides of said pad and securing the marginal edge portions of said cover to the back side of said pad to form an assembly, mounting the assembly to a support frame including the step of clamping an assist fixture connected to the support frame into releasable engagement with the assembly to mount the assembly to the support frame and maintain the fabric cover in proper registration with the pad; and with the assist fixture clamped thereon, substantially simultaneously applying both pressure and heat to substantially the entire area of the front of said cover to force said cover into engagement with substantially the entire area of the front appearance surface of said pad until a layer of heat-activatable adhesive between said cover and the front appearance surface of said pad activates and bonds said cover to the pad.

23. The process as claimed in claim 22, wherein the adhesive is disposed on the back of the central area of said cover such that during the heat-applying step the central area of said cover is bonded to the pad and the marginal edge portions of said cover are not bonded to the peripheral sides of the pad but are free to allow minor flexing of said cover to inhibit the onset of creasing.

24. The process as claimed in claim 22, wherein the pressure and heat applying step includes forcing the front of the assembly into conforming engagement with a fluidized bed of heated particles maintained fluid by compressed air at a temperature sufficient to activate the adhesive.

25. The process as claimed in claim 24, wherein the appearance surface of the pad is preformed to include at least one appearance depression, and the clamping step includes forcing a selected tubular member of the assist fixture into said depression.

26. The process as claimed in claim 25, wherein the pressure and heat applying step includes simultaneously forcing air at a predetermined temperature through said tubular member to enhance bonding of the cover in said depression.

27. The process as claimed in claim 26, wherein the appearance surface of said pad is preformed to include a contoured surface having a plurality of appearance depressions, and said clamping member includes a corresponding plurality of tubular members configured to be received within said plurality of the appearance depressions.

28. The process as claimed in claim 24, wherein said pad is comprised of a porous material, and said positioning step further includes the step of applying a vacuum to the back side of said porous material so that heated air is drawn through said porous material when the assembly is forced into said fluidized bed to enhance activation of said adhesive.

29. The process as claimed in claim 28, including removing the assembly from the fluidized bed after the adhesive has been activated, and thereafter maintaining the vacuum for a time sufficient to enhance cooling of the cover and curing of the adhesive.

30. In a process for covering the appearance surface of a flexible pad having at least one appearance depression with at least one flexible cover sheet, the steps of the method comprising:
preassembling the pad onto a support fixture and securing the cover sheet onto the pad to form an assembly,
positioning an assist fixture having a tubular frame member relative to the assembly so that said tubular frame member is aligned with said appearance depression in said pad and forcing said tubular frame member against said flexible cover to force a portion of said flexible cover into said appearance depression,
pressing the assembly with said assist fixture positioned thereon into a heated fluidized bed whereby the bed conforms to the contour of the appearance surface of the pad and presses the cover sheet against substantially the entire area of the appearance surface of the pad,
maintaining the pressed engagement until a layer of heat-activatable adhesive between the cover sheet and the pad activates and bonds the cover sheet to the pad,
passing heated fluid through said tubular frame member to enhance activation of said adhesive in said appearance depression,
removing the assembly from the bed, terminating the flow of heated fluid through said tubular member, and allowing the adhesive to cure while retained by the assist fixture,
removing the assist fixture from the assembly, and removing the assembly from the support fixture.

31. The process as claimed in claim 30, including the step of precoating the back of said cover sheet with said heat-activatable adhesive.

32. The process as claimed in claim 30, including the step of inserting a separate sheet of heat-activatable adhesive between the cover sheet and the appearance surface of the pad, prior to the step of pressing the support fixture into the fluidized bed.

33. The process as claimed in claim 30, further including the step of passing cooling fluid through said tubular frame member during said curing step.

34. The process as claimed in claim 30, wherein said preassembling step further includes connecting a vacuum source to the support fixture so that heated air is drawn through the assembly when the assembly is pressed into the fluidized bed to enhance activation of the adhesive.

35. The process as claimed in claim 34 including the step of continuing to draw air through said assembly after removal of said assembly from the fluidized bed and prior to removal of said assist fixture to facilitate cooling of the bonded cover sheet prior to removal of said assembly from said support fixture.

36. The process as claimed in claim 34, wherein the preassembling step includes securing the marginal edge portion of the cover sheet adjacent to the rear side of said pad.

37. The process as claimed in claim 10, wherein the pad has a contoured front appearance surface, a back side and peripheral sides, and the step of securing the cover sheet onto the pad comprises securing the marginal edge portions of the cover to the back side of the pad to form the assembly.

* * * * *